United States Patent [19]

Dittmann et al.

[11] 4,425,412
[45] Jan. 10, 1984

[54] LEAD/ACID BATTERY HAVING HORIZONTAL PLATES

[75] Inventors: John F. Dittmann; Elliott M. Morse; Earl S. Carr, all of Joplin, Mo.

[73] Assignee: Eagle-Picher Industries, Inc., Cincinnati, Ohio

[21] Appl. No.: 382,246

[22] Filed: May 26, 1982

[51] Int. Cl.³ .................... H01M 2/12; H01M 6/46; H01M 4/56
[52] U.S. Cl. .................................... 429/53; 429/152; 429/153; 429/225
[58] Field of Search ............... 429/53, 152, 153, 154, 429/155, 157, 204, 225

[56] References Cited

U.S. PATENT DOCUMENTS

| | | | |
|---|---|---|---|
| 873,132 | 12/1907 | Marino et al. | 429/225 |
| 2,715,652 | 8/1955 | Chubb et al. | 136/100 |
| 2,740,821 | 4/1956 | Bone | 136/111 |
| 3,434,883 | 3/1969 | Babusci et al. | 136/14 |
| 3,862,861 | 1/1975 | McClelland et al. | 136/26 |
| 3,895,959 | 7/1976 | Dehmelt | 136/6 R |
| 3,933,522 | 1/1976 | Steig | 429/153 |
| 4,321,315 | 3/1982 | Jensen | 429/152 |
| 4,352,867 | 10/1982 | Catanzarite | 429/152 |

Primary Examiner—Brian E. Hearn
Assistant Examiner—Stephen J. Kalafut
Attorney, Agent, or Firm—Wood, Herron & Evans

[57] ABSTRACT

Disclosed are maintenance-free cells and batteries of the lead/acid type which have improved deep cycle life. The plates are flat and are oriented horizontally as a stack in a cell which contains unabsorbed free electrolyte. The free electrolyte wets but does not cover the top surface of at least one negative plate. The vertical dimension of the plate stack must not exceed one-half its major horizontal dimension.

13 Claims, 4 Drawing Figures

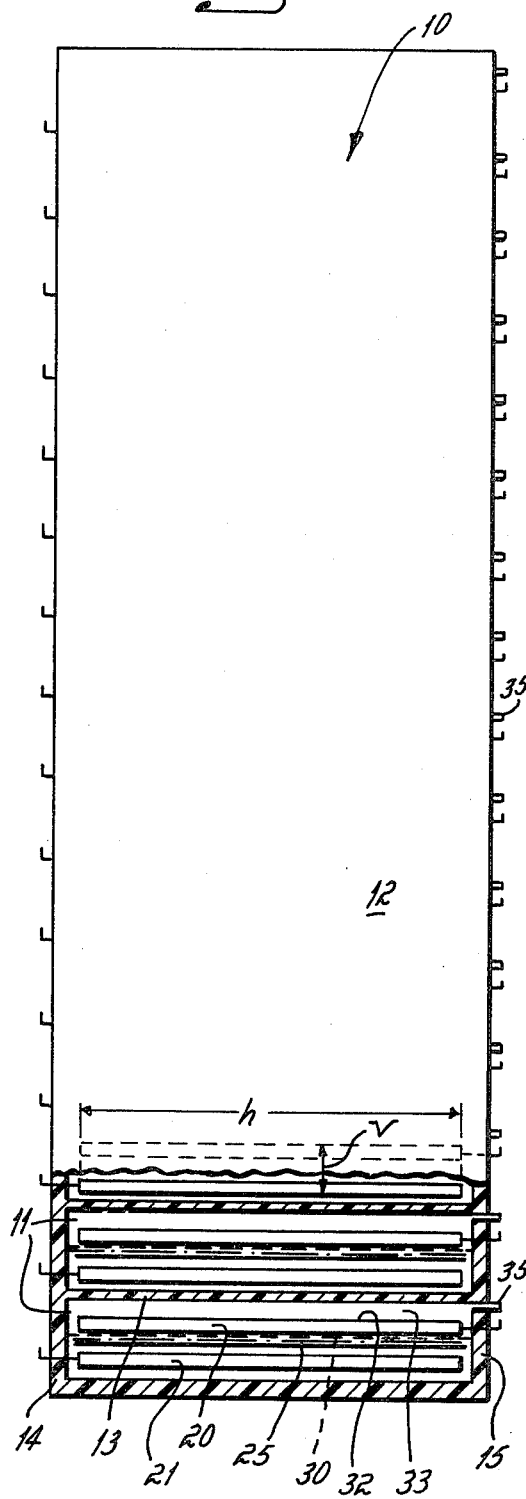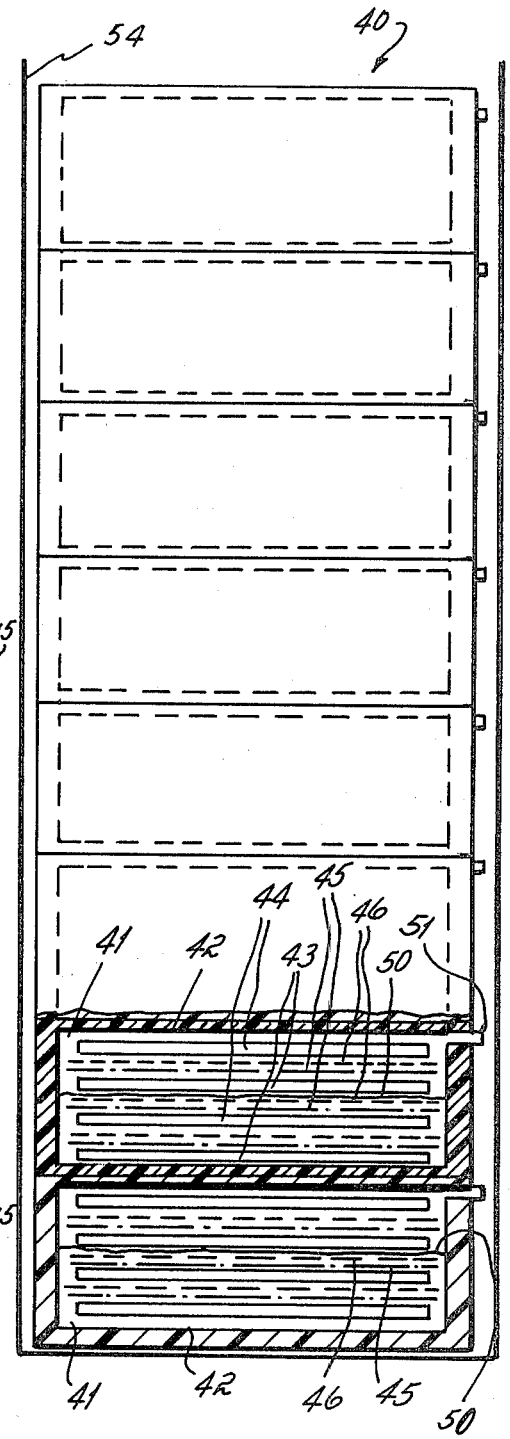

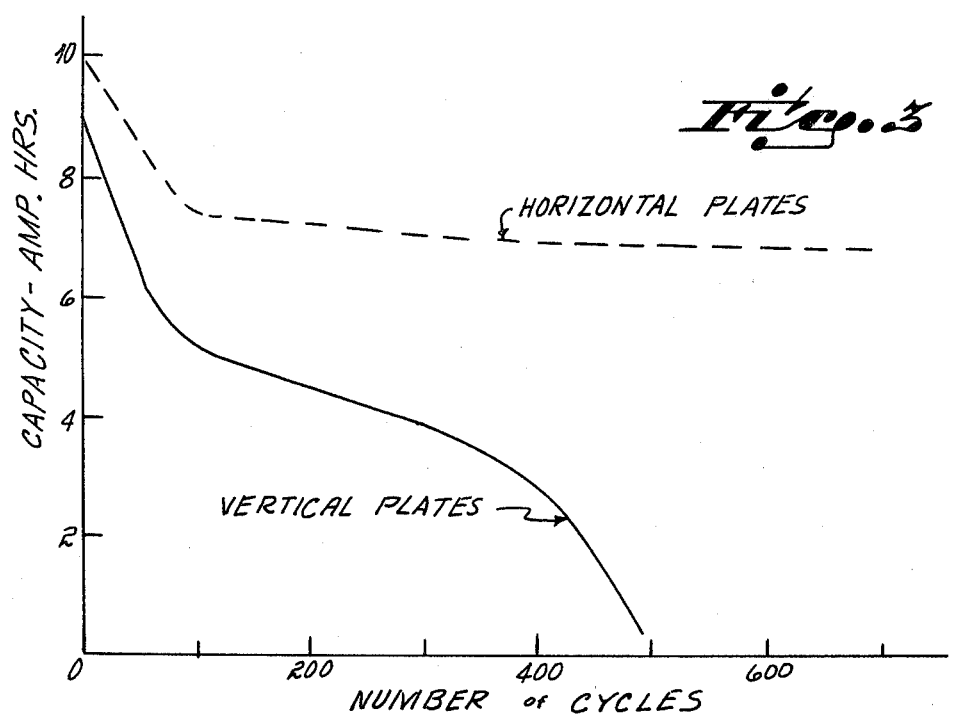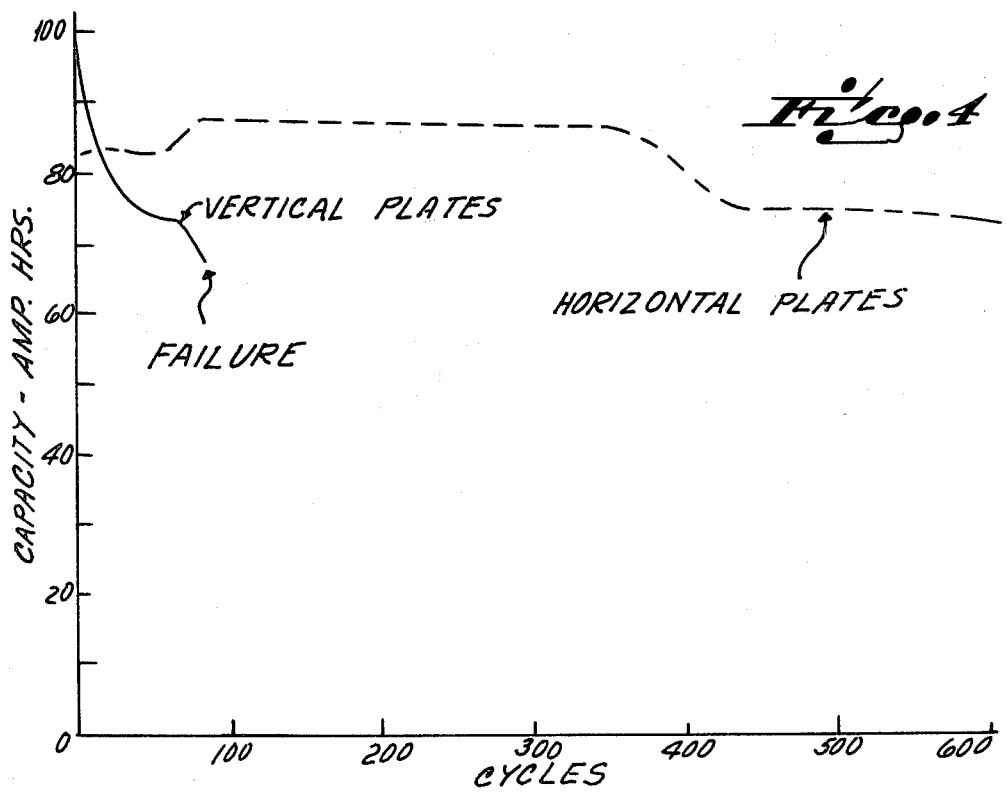

LEAD/ACID BATTERY HAVING HORIZONTAL PLATES

FIELD OF THE INVENTION

This invention relates to maintenance-free lead/acid cells and batteries and which provide remarkably improved deep cycle life.

BACKGROUND

Lead/acid batteries are "cycled" as they are repeatedly discharged and recharged. In a "shallow" cycle (for example, as in starting an automobile engine), the extent of discharge is relatively small and the discharge is followed more or less immediately by recharging (for example, as the engine drives the generator); only a small proportion of the ampere/hour capacity of the battery is used.

In some applications, however, the extent or "depth" of discharge before recharge is much greater. For example, in a battery-powered forklift truck the battery may be discharged for a number of hours (during the working day) before it can be recharged (typically overnight). The major portion of the capacity of the battery may be used before recharging commences. The discharge/charge cycle is said to be a "deep cycle" if more than about 40% of the ampere/hour capacity of the battery is drawn before the battery is recharged. "Deep cycle life" is the expected longevity of a battery which is in deep cycle use, expressed for example as the number of deep discharge cycles before battery capacity drops below a defined percentage (usually 80%) of its original capacity.

During the discharge portion of the use cycle of a lead/acid battery, the sulfuric acid electrolyte partially converts the lead peroxide (PbO₂) active material of the positive plates to lead sulfate (PbSO₄), and also converts the spongy lead of the negative plates to lead sulfate. The electrolyte is diluted by the loss of sulfate ions to the plates and by the water formed in the reaction:

$$PbO_2 + Pb + 2H_2SO_4 \rightarrow 2PbSO_4 + 2H_2O$$

Reversely, in the charge portion of the cycle, lead sulfate on the positive plates is reconverted to the peroxide, the lead sulfate on the negative plates is converted back to lead, and the acid is regenerated. If the battery is overcharged, some of the electrolyte liquid is electrolyzed to hydrogen and oxygen gas, which in an unsealed battery escapes to atmosphere, and water must be added to prevent the electrolyte from becoming too concentrated. In a conventional "maintenance-free" battery (which has grids of "non-antimonial" lead), only a little gas is evolved in charging because the voltage is controlled and the current drops to a small level at the end of charge. This greatly reduces electrolysis, so that little gas is vented; hence no additions of water are required to such batteries.

In a sealed battery, oxygen gas evolved in recharging is retained within the cells and is recombined to form water:

$$2Pb + O_2 \rightarrow 2PbO$$

$$PbO + H_2SO_4 \rightarrow PbSO_4 + H_2O$$

Hydrogen gas is not normally evolved in a sealed battery because the active material balance is such that the positive plates reach full charge before the negative plates.

The deep cycle life of the different types of batteries varies greatly. Maintenance-requiring batteries with very good deep cycle life are available. However, it has not heretofore been possible to produce maintenance-free batteries with good deep cycle life, at least in the large capacities and shapes needed for certain commercial and industrial applications. Thus, maintenance-free batteries have been restricted to use in applications which involve only shallow discharge cycles, for example, in automobiles. They have not been satisfactory for heavy use where good deep cycle life is requisite, as in industrial forklift trucks. By way of illustration, test maintenance-free batteries of conventional type but sized for use in a golf cart, could be deeply cycled relatively few times before their capacity started to decrease severely; and after about 50 cycles their capacity became so low that they were of little further use. Such short deep cycle life is grossly inadequate for commercial use.

BRIEF DESCRIPTION OF THE INVENTION

It has now been found that the deep cycle life of maintenance-free lead/acid batteries depends importantly on the orientation and order of the plates within the cell, the relative depth and quantity of the electrolyte within the cell in relation to the plates, the nature of the separator, and the "aspect ratio" or height/width relationship of the cell.

In accordance with the invention, a sealed cell is formed of a plurality of flat, parallel plates which are arranged horizontally. The positive plate(s) has as its active material lead dioxide; and the negative plate(s) is of spongy lead. Each cell preferably has a negative plate as the uppermost plate in the cell. The cell contains free electrolyte, that is, electrolyte which is not absorbed or immobilized in the pores of the plates or in the separators. The separators between the positive and negative plates are a combination of layers of semi-permeable film and absorbent acid-resistant fibrous or matt material. The electrolyte covers most of the plate stack but does not cover the stack entirely. At least one horizontal negative plate surface is above the electrolyte level, so that that surface is dampened by the electrolyte but is normally above the electrolyte level during charging. The vertical dimension of each cell, that is, the distance between the lower surface of the bottom plate and the top surface of the top plate, is less than one-half the major horizontal dimension (length or width) of the plates; that is to say, the cells must be relatively low and wide, rather than cubical or tall and narrow. To form a battery the cells can be stacked vertically, and/or positioned side by side in a horizontal plane; but in any event the cells must be oriented so that their plates are horizontal.

As previously indicated, the improvement in deep cycle life afforded by this construction is remarkable in comparison to previous cells having vertically oriented plates; and the improvement becomes more pronounced the deeper the cycling regime. The batteries of the new construction may perform like other batteries in shallow cycle operation, but they will perform substantially better than others at cycles of 40% discharge, and better yet at cycles of 60% discharge. By way of illustration, batteries with horizontal plates which are cycled at 60% depth of discharge provided over 600 cycles, whereas otherwise similar batteries with vertically oriented plates provided only 81 cycles before failure.

THE PRIOR ART

Virtually from the inception of lead/acid batteries, it has been the usual practice to orient the plates vertically. This practice appears to have arisen from the fact that the electrolyte is an acid liquid. Vertical plate orientation enables the plate terminals and the fill vent opening to be located on the top surface of the battery, above the level of the acid electrolyte. That arrangement avoids any need for sealing a terminal in a vertical cell wall, below the electrolyte level, so that the chance of leakage is thereby reduced.

Various types of batteries having horizontal plates have been produced, see for example the U.S. patents to Dehnolt No. 3,895,959; to Bone No. 2,740,821; and to Chubb No. 2,715,652. However, in such previous constructions the couples have not been lead/acid, and/or the electrolyte has been immobilized as a paste or has been fully absorbed.

Babusci U.S. Pat. No. 3,434,883 uses conical plates that are stacked horizontally, but the battery is not sealed and is not designed for deep cycle use. The battery is for "float" applications in which it is maintained in a fully charged condition for emergency or "standby" power; it is only rarely cycled.

It is known that sealed lead/acid batteries can be oriented in different positions; being sealed, the acid electrolyte cannot escape, see McClelland et al U.S. Pat. No. 3,862,861. However, that patent requires that essentially all of the electrolyte be completely absorbed within the separator and the pores of the plates, so that the cell is "starved" and there is essentially no free electrolyte. That construction demonstrates a high amount of overcharge heating, which in practice limits its use to small batteries for shallow cycle application. It has not proven useful for deep discharge batteries, e.g., in the sizes and capacities needed for industrial fork lifts.

A sealed maintenance-free deep cycle battery must be able to reliably recombine evolved oxygen and maintain a homogeneous (non-stratified) electrolyte throughout its cycling regime. Starved electrolyte batteries can meet those conditions only with very careful charge control to prevent overcharge heating and thermal runaway. This invention utilizes free electrolyte, and film separators that prevent excessive heat of recombination and horizontal plate stacking and limited cell height to limit stratification of the electrolyte.

DESCRIPTION OF THE DRAWINGS

The invention can best be further described and explained by reference to the accompanying drawings, in which:

FIG. 1 is a vertical section through a "monoblock" battery in accordance with the presently preferred embodiment of this invention, for use in powering a fork lift truck;

FIG. 2 is a vertical section through a battery comprised of separate cells, each in accordance with the invention;

FIG. 3 is a graph which illustrates the comparative cycle life of conventional maintenance-free batteries having upright plates, with that of batteries having horizontal plates, at 40% discharge; and FIG. 4 is a graph generally similar to FIG. 3, but shows cycle life at 60% discharge.

DETAILED DESCRIPTION

In FIG. 1, a battery 10 is shown which is comprised of cells individually designated by 11. The particular battery shown for purposes of explanation is of the "monoblock" type wherein the individual cells are not enclosed within separate containers, but rather are located in separate sealed compartments in battery case 12. The cell compartments are defined between horizontal partitions 13 that are sealed to the battery case vertical walls 14 and 15.

Each cell 11 comprises at least one flat, horizontal negative plate 20 of spongy lead and one flat, horizontal positive plate 21 of lead peroxide. The positive and negative plates 20 and 21 can be formed in accordance with conventional plate making technology.

The cells shown for purposes of illustration in FIG. 1, have only one pair of plates each, one negative and one positive. The cell may however have additional pairs of positive and negative plates, and may also have one extra negative plate. In the preferred embodiment the uppermost plate in each cell is a negative plate, as at 20. The lowermost plate may be a positive plate 21, as shown in FIG. 1 or, if an extra negative plate is used, the lowermost plate may be negative.

The plates of each cell are separated by separator means as at 25. A combination of both a film and an absorbent matt separator material is preferred. The use of film as part of the separator is important because it prevents formation of lead dendritic shorting between positive and negative plates and also reduces overcharge current and associated heating.

In FIG. 1 the positive and negative plates are shown spaced apart for greater clarity. In general however the plates form a stack in which the lower plates carry the weight of the upper plates. It is not necessary to provide clearance between the upper negative plate and the partition or cell top surface; that is, oxygen recombination will occur effectively even absent such open space, provided the horizontal surface of at least one negative plate is not immersed in electrolyte during charging.

The positive and negative plates have electrode terminations which preferably extend through (and are sealed to) the case walls 14 and 15.

Each cell contains sulfuric acid electrolyte liquid in an amount insufficient to entirely fill the remaining volume of the chamber. The surface level 30 of the free electrolyte should be high enough to dampen the uppermost negative plate 20, but not to cover its upper surface 32. In practice, the depth of the free electrolyte may in use be as little as one-half the height of the plate stack, or even less; the plate or plates above the electrolyte surface will be wetted by capillary action and/or battery movement. An oxygen recombination space 33, unfilled by electrolyte, thus exists above the liquid level, adjacent the top plate 20. It is believed that the free electrolyte acts as a control of rate of oxygen recombination with the spongy lead of the negative plate and heat generated by this reaction.

Each cell is normally sealed from the others and from atmosphere, so that electrolyte cannot escape from it. An excess pressure one-way relief valve designated at 35 is provided for each cell, to vent gas pressure in excess of a predetermined value, e.g., approximately 5 psig. The valve may be of conventional construction, and can be situated in the cell side wall above the electrolyte level.

It is further important that in each individual cell the height or vertical distance v between the top surface of the top plate and the bottom surface of the bottom plate, be no more than one-half the major horizontal dimension h (length or width, whichever is greater, and including terminal connection) of the plates. This means that the plate stack in each cell is relatively low (in height) and wide (horizontally). This low aspect ratio appears to contribute importantly to providing the observed excellent deep discharge cycle life.

FIG. 2 illustrates a battery 40 comprising a set of separately housed cells 41. Each cell 41 has a case 42 enclosing a stack of alternating negative plates 43 and positive plates 44, a four plate stack with a positive top plate being shown. The separator is a semi-permeable film 45 and an absorbent matt 46. The surface 50 of the free electrolyte lies just above the lower two plates of the stack; the upper positive and negative plates are dampened but not covered by the electrolyte. The electrolyte level is usually not constant during cell use and will, for example, decrease during discharge and rise during recharge. The vent 51 is above the electrolyte level. The cells 41 are electrically connected by means not shown. The battery case 54 is preferably sealed but can be open topped, as shown.

One advantage of this invention is that it enables deep cycle, maintenance-free batteries to be made in the tall, narrow shapes that are often required for forklift truck use. If sealed batteries of such shapes were made with vertical plates, sulfuric acid electrolyte stratification would soon become severe, with resulting failure.

FIG. 3 illustrates the remarkable improvement in cycle life which is obtained by use of cells and batteries having horizontal plates, in comparison to otherwise similar sealed batteries having vertical plates. Two sets of six-volt lead/acid batteries were made, each battery having a capacity of nine ampere/hours at one hour rate. In one set of batteries the plates were oriented in the conventional vertical position. The second set of batteries was otherwise similar but the plates were oriented in horizontal position. Both batteries were tested under the same conditions, in which they were cycled by discharge to 40% of rated capacity, then recharged for six hours at 2.55 volts per cell. FIG. 3 illustrates the variation in capacity of the recharged batteries as the number of cycles increases. As illustrated, the average capacity of the batteries with the vertical plates decreased rather rapidly over the first 100 cycles from 9 AH to about 5.2 AH; thereafter it decreased linearly to about 3 AH after a total of 400 cycles, and then dropped off very rapidly.

In comparison, the average capacity of the batteries having horizontal plates decreased from an initial value of about 10 AH to 7.7 AH after 100 cycles, then decreased only slightly to about 7 AH after 400 cycles. The average capacity of these batteries was still about 7 AH even after 700 cycles, whereas the otherwise similar batteries with vertical plates ceased to have any utility after about 450 cycles. However, the batteries did not display a significant difference over the vertical plate batteries, when subjected to only shallow cycling.

FIG. 4 represents the results of a test similar to that just described in reference to FIG. 3, but was carried out with larger batteries (100 AH), discharged to 60% of capacity. Batteries with vertically oriented plates in this cycle regime provided only 81 cycles before failure, whereas batteries with horizontally oriented plates still had stable capacities after approximately 600 cycles. (Failure is generally defined as inability to recharge to at least 80% of rated capacity.)

Without intending to limit the invention, it is believed that the improvement obtained in accordance with the invention can be explained as follows:

From examination of vertical plate batteries it appears that the bottom portion of the plates is used less than the top portion, and that the difference became more pronounced as the number of cycles increases. It also appears that the electrolyte "stratifies" as cycling continues. The sulfuric acid electrolyte in a new, fully charged battery normally has a specific gravity between about 1.2 and 1.3. As cycling proceeds, however, the gravity of the electrolyte at the bottom of the cell becomes much greater, as high as 1.4, whereas that at the top of the cell becomes lighter, as low as 1.1.

During discharge, the electrolyte loses sulfate ions to the plates and gains water. It thus has a lower density than originally. Later, during recharge, sulfate ions return to the electrolyte and the acid is reformed to the original specific gravity. However, unless physical mixing takes place the sulfate ions in the acid gradually settle, resulting in increasing vertical non-uniformity of concentration. Such stratification can be overcome if the electrolyte is remixed by the gas bubbles that are normally formed near the end of the recharge period: as the bubbles rise to the top they agitate and thereby remix the electrolyte. However, in maintenance-free batteries of the type wherein the gassing is restricted in order to reduce loss of water from the system, the electrolyte does not remix as well. The greater the vertical height of the plates, the greater the extent to which the electrolyte can stratify. In contrast, because of the short vertical dimension of the cells of this invention, there is little "depth" of electrolyte in which stratification can occur; and, because each plate is horizontal, there is no different electrolyte composition along the surface of any individual plate.

The requirement for at least one unflooded negative plate can now be explained. The oxygen evolved in charging will recombine at an unflooded or exposed negative surface. By limiting the depth of electrolyte so that at least the top surface of one negative plate is above the electrolyte level, a large gas recombination area is provided. (This negative plate surface is preferably the top plate surface in the stack; however, a positive plate may reside over the negative, so long as the negative is not itself immersed in free electrolyte.) This insures that gas pressure is kept suitably low, without venting. Thus gassing can be allowed to occur, so as to cause some mixing of the free electrolyte, because the oxygen recombines at the negative plate surface, and thus maintains the balance of the total electrochemical system.

A further reason for the effectiveness of the batteries of this invention arises from the fact that as a lead/acid battery is cycled, the initial positive oxide paste is gradually converted to a relatively softer, somewhat loose mass as cycling continues. In a vertical plate battery, this material is easily dislodged from the plates and can "shed" and fall to the bottom of the cell and thereby become ineffective. Here, because the plates are horizontal, this active material is better retained on the plates.

The common practice in the lead/acid battery industry has been to form the grids from so-called "antimonial lead" (a lead-antimony alloy containing about 4-10 wt. % of antimony). Among other things, the presence of antimony tends to cause earlier gassing and electrolyte mixing. However, because antimony causes self-discharge and increasing production of gases, it has increasingly been the practice to use so-called "non-antimonial lead," that is, lead having less than about 2¾ wt. % antimony, or to use lead which contains essentially no antimony, for the grids of maintenance-free batteries. While this has reduced gassing, it has also increased electrolyte stratification, which has in turn adversely affected the deep cycle life of previous maintenance-free batteries.

It is a further advantage of the present batteries that, because they do not depend so critically on electrolyte mixing by gas bubbles for good deep cycle performance, the plates can, if desired, be made of non-antimonial lead.

Having described the invention, what is claimed is:

1. A maintenance-free lead/acid cell of improved deep cycle life, comprising
   a container,
   a stack of flat horizontal plates sealed in the container and comprising at least one negative plate of spongy lead and at least one positive plate of lead peroxide,
   separator means between each pair of adjacent plates in the cell,
   the container containing unabsorbed, free sulfuric acid electrolyte, the level of the unabsorbed electrolyte in the container being sufficient to wet but not to cover at least one face of the uppermost negative plate in the plate stack, so that at least the top surface of said uppermost negative plate is normally above the electrolyte level,
   the container being sealed so that electrolyte cannot escape from it and having a relief valve for venting excessive gas pressure therein,
   the height of the plate stack being no more than half its major horizontal dimension.

2. A cell in accordance with claim 1 wherein the separator means comprises both a semi-permeable film and an absorbent matt separator.

3. A cell in accordance with claim 1 having only one positive plate and one negative plate.

4. A cell in accordance with claim 1 wherein the cell has a negative plate as its uppermost plate, at least the top surface of the uppermost negative plate being above the surface of the electrolyte.

5. A cell in accordance with claim 1 wherein the plate grids are of lead and contain less than about 2¾% antimony by weight.

6. A cell in accordance with claim 1 wherein the positive and negative plates of the cell have terminals that project horizontally through a vertical end wall of the cell container.

7. A battery comprised of cells each in accordance with claim 1,
   the battery further comprising a battery case in which the cells are stacked on top of one another, each cell oriented so that the plates within it are horizontal, and means electrically connecting the respective cells.

8. A battery in accordance with claim 7 wherein the height of the battery is several times the height of the plate stack within a single cell.

9. A maintenance-free lead/acid battery of improved deep cycle life, comprising,
   a battery case,
   means in the battery case defining sealed cell compartments,
   a cell within each cell compartment, each cell comprising a stack of flat horizontal plates including at least one positive plate of lead peroxide and at least one negative plate of spongy lead,
   separator means between each pair of adjacent plates in each cell,
   each cell containing unabsorbed free sulfuric acid electrolyte which covers a major part of the stack, the level of the electrolyte in the cell being sufficient to wet but not cover the top surface of at least one negative plate in the upper part of the stack, so that at least the top surface of said one negative plate is normally above the electrolyte level,
   each cell having a relief valve for venting excessive gas pressure therein,
   the height of the plate stack in each cell being no more than half the major horizontal dimension of the stack, and
   means electrically connecting the plates of the respective cells to positive and negative terminals of the battery.

10. The battery of claim 9 wherein the separator means comprises both semi-permeable film and an absorbent matt separator.

11. The battery of claim 9 wherein the cells are located one above another in the battery case.

12. The battery of claim 9 wherein the cells are separated from one another by horizontal partitions within the battery case.

13. The battery of claim 9 wherein the cells are arranged side by side in the case and are separated by means including vertical walls.

* * * * *